(12) United States Patent
Liehr et al.

(10) Patent No.: US 10,309,837 B2
(45) Date of Patent: Jun. 4, 2019

(54) MEASURING DEVICE, IN PARTICULAR FOR USE IN THE PROCESS MEASUREMENT TECHNOLOGY, COMPRISING A CYLINDRICAL SENSOR TIP

(71) Applicant: IFM ELECTRONIC GMBH, Essen (DE)

(72) Inventors: Sebastian Liehr, Wasserburg (DE); Stephan Reichart, Ravensburg (DE); Walter Reichart, Fronreute (DE)

(73) Assignee: IFM ELECTRONIC GMBH, Essen (DE)

( * ) Notice: Subject to any disclaimer, the term of this patent is extended or adjusted under 35 U.S.C. 154(b) by 394 days.

(21) Appl. No.: 14/889,998

(22) PCT Filed: May 12, 2014

(86) PCT No.: PCT/EP2014/059660
§ 371 (c)(1),
(2) Date: Nov. 9, 2015

(87) PCT Pub. No.: WO2014/184142
PCT Pub. Date: Nov. 20, 2014

(65) Prior Publication Data
US 2016/0103020 A1    Apr. 14, 2016

(30) Foreign Application Priority Data
May 14, 2013  (DE) .................. 10 2013 208 785

(51) Int. Cl.
*G01L 7/00* (2006.01)
*G01K 1/16* (2006.01)
(Continued)

(52) U.S. Cl.
CPC .............. *G01K 1/16* (2013.01); *B23K 1/0008* (2013.01); *G01K 7/16* (2013.01)

(58) Field of Classification Search
CPC combination set(s) only.
See application file for complete search history.

(56) References Cited

U.S. PATENT DOCUMENTS 4,230,935 A * 10/1980 Meixner ................ H01C 7/022
                                                              219/523
4,874,924 A * 10/1989 Yamamoto .......... A01M 1/2077
                                                              392/391
(Continued)

FOREIGN PATENT DOCUMENTS

DE    10 2006 048448 A1    4/2008
DE    10 2012 206647 A1    10/2013
(Continued)

OTHER PUBLICATIONS

English translation of applicant cited reference DE102012206647.*
(Continued)

*Primary Examiner* — Lisa M Caputo
*Assistant Examiner* — Nasir U. Ahmed
(74) *Attorney, Agent, or Firm* — Schmeiser, Olsen & Watts, LLP

(57) ABSTRACT

A measuring device, in particular for use in the process measurement technology, including a cylindrical sensor tip which includes a closed housing, a sensor element disposed within the housing in the form of a temperature dependent resistor and for generating a sensor signal, and electronic components, which are connected to the sensor element via electrical connecting lines and/or a conductor film, wherein said sensor element is thermally connected to the housing by means of a solder and a heat conducting, electrically insulating layer is disposed between the sensor element and the solder is provided.

6 Claims, 2 Drawing Sheets

(51) Int. Cl.
*B23K 1/00* (2006.01)
*G01K 7/16* (2006.01)

(56) References Cited

U.S. PATENT DOCUMENTS

| | | | | |
|---|---|---|---|---|
| 5,122,925 | A | * | 6/1992 | Inpyn ................... H05K 7/1417 361/704 |
| 5,428,994 | A | | 7/1995 | Wenzel et al. |
| 6,248,978 | B1 | * | 6/2001 | Okuda ............... G03G 15/2064 219/216 |
| 2007/0195857 | A1 | * | 8/2007 | Krishnamurthy ........ G01K 1/16 374/148 |

FOREIGN PATENT DOCUMENTS

| | | |
|---|---|---|
| JP | H05 264044 A | 10/1993 |
| JP | H07 333069 A | 12/1995 |

OTHER PUBLICATIONS

EPO translation of JPH07333069.*
International Search Report; PCT/EP2014/059660; International Filing Date: May 12, 2014; 6 pgs.

* cited by examiner

MEASURING DEVICE, IN PARTICULAR FOR USE IN THE PROCESS MEASUREMENT TECHNOLOGY, COMPRISING A CYLINDRICAL SENSOR TIP

CROSS-REFERENCE TO RELATED APPLICATIONS

This application claims priority to PCT Application No. PCT/EP2014/059660, having a filing date of May 12, 2014, based on DE 10 2013 208 785.3, having a filing date of May 14, 2013, the entire contents of which are hereby incorporated by reference.

FIELD OF TECHNOLOGY

The following relates to a measuring device, in particular for use in the process measurement technology, comprising a cylindrical sensor tip.

BACKGROUND

Measuring devices of the aforementioned type are used in the automation technology for monitoring the properties of a fluid, for example in terms of pressure, temperature, flow rate, level, wherein a cylindrical sensor tip is provided most often in thermometers and thermal flow meters. In such measuring devices a temperature sensitive electronic component, which senses the temperature of a medium surrounding the sensor tip, is located in the sensor tip. As one example a Pt100 element can be mentioned. In order to enable that the temperature is transmitted almost without loss to the temperature sensitive component it is soldered to the inside of the housing wall of the sensor tip. A thermally conductive, but electrically insulating layer which is disposed between the temperature sensitive component and the solder, ensures the almost loss-free transmission of the temperature to this component, however, it isolates the component from the housing of the sensor tip. Such a configuration is shown, for example, in EP 0 590 449 A2.

For the thermal and, thus, metrological characteristics of such measuring devices comprising components soldered in the sensor tip the soldering process, in which the component in question is connected to the inner bottom of a housing consisting e.g. of stainless steel, is critical. Non-controllable fluctuations during the soldering process can lead to significant variations in the characteristics of a sensor series. In particular with flow meters in addition to the amount also the homogeneity and geometric distribution of the solder is critical for a qualitatively constant production of the sensor tips and their metrological characteristics. This can inter alia be crucial in determining whether the measuring devices subsequently have to be calibrated individually or not.

Thus, problematic is on the one side the soldering process itself, since the diameter of the sensor tip is usually in the range 5-10 mm and, thus, a soldering process in a conventional manner is not possible. On the other side, a constant solder distribution and a uniformly thick layer of solder must be ensured in order to keep the dispersion of the characteristics of the measuring device as small as possible and to reduce the calibration effort of manufactured measuring devices.

In this regard DE 10 2006 048 448 A1 proposes to apply a predetermined amount of solder onto the component and to approach the component to the inside of the sensor tip such that the solder is located between the component and the inside of the sensor tip, and subsequently to melt the solder. However, herein a disadvantage is the comparatively high expenditure, in particular with respect to the necessary overhead soldering process and that a displacement mechanism has to be provided in order to realize the defined approach of the component.

SUMMARY

An aspect relates to reproducibly soldering a temperature sensitive electronic component to the inside of a sensor tip with a constant solder distribution and a uniformly thick layer of solder and thereby to reduce the manufacturing effort and to improve the heat transfer.

Embodiments of the invention consist in a step-like recess, which is formed at the inside of the housing of the sensor tip, more specifically at its end face. A conductor film adapts in a U-shaped manner to the inner contour of the sensor tip, wherein the temperature sensitive component is arranged on the conductor film in the region of the end face of the sensor tip. By means of the recess the solder has a defined area in which it can distribute itself, wherein this distribution process is not or cannot be influenced by the conductor film or by a tool for inserting the conductor film.

For the thermally conductive, electrically insulating layer the use of a ceramic substrate has been found to be advantageous. Herein, the sensor element is applied directly onto this substrate and is either wired directly or is electrically contacted via a conductor film on the back side.

Preferably, the step-like recess is disposed at the end face of the housing, i.e. at its distal end, because in many cases the positioning of the sensor element at this location has been found to be advantageous. However, this step-like recess can also be provided at another location, for example at the side wall.

The recess can be produced by reducing the wall thickness of the housing of the sensor tip, for example by a turning or a milling process, or alternatively by a forming process, such as deep drawing or stamping, or by inserting an annular body into the housing, and has a depth in the range of 100-500 µm, preferably 100-300 µm, particularly preferably 150 µm.

BRIEF DESCRIPTION

Some of the embodiments will be described in detail, with reference to the following figures, wherein like designations denote like members, wherein.

In the figures, unless otherwise indicated, like reference numerals designate like parts having the same meaning.

DETAILED DESCRIPTION

Figure 1:
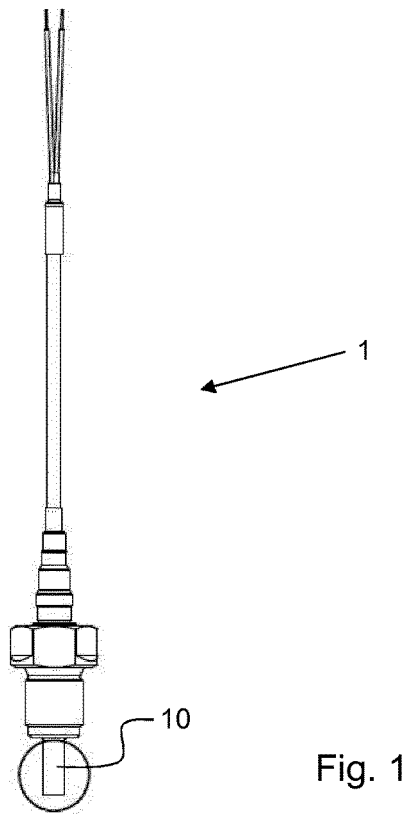
FIG. 1 shows a side view of a measuring device used in the process measurement technology.

FIG. 1 shows a measuring device 1 used in the process measurement technology, which in the present case is a thermal flow meter. A temperature measuring device is also conceivable and encompassed by embodiments of the invention. The measuring device 1 comprises, among others, a cylindrical sensor tip 10 which comes into contact with the medium to be measured and includes the electronic components necessary for the actual measurement. The circular outlined area of the sensor tip 10 is shown enlarged in the sectional view of FIG. 2.

Figure 2:
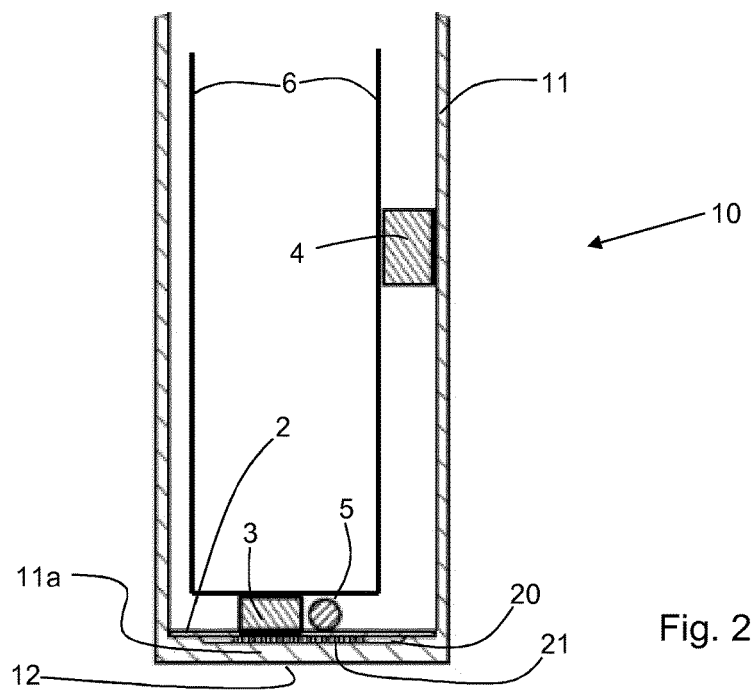
FIG. 2 shows an enlarged sectional view of the sensor tip of the measuring device of FIG. 1.

In FIG. 2 the sensor tip 10 is depicted enlarged in a sectional view. The sensor tip 10 includes a cylindrical housing 11 formed with a recess 20 at its end face 12. As can be seen in FIG. 2, the recess 20 does not extend over the entire inner diameter of the housing 11 but only in a partial area, such that a step is provided.

The implementation in which the recess 20 is arranged at the end face 12 merely represents a preferred embodiment. Of course, this recess 20—depending on where the temperature sensitive resistors are positioned—may, for example, be disposed at the side wall of the housing 11. It is essential that the recess is disposed at the location where the heat transfer from the medium to the sensor element occurs.

A flexible conductor film 6 is disposed in a U-shaped manner in the housing 11 and includes the electronic components necessary for the thermal flow measurement, inter alia a first thermistor element 3, a second thermistor element 4 and a heating element 5. The thermistor elements may, for example, be embodied as Pt100 device and the heating element may be embodied as a resistor element. By means of the first thermistor element 3 a first temperature is measured, which is directly affected by the heating element 5. The second thermistor element 4 acts as a reference and measures a second temperature, which indeed is also influenced by the heating element 5, however, there is a dependence on the flow velocity of the medium which surrounds the sensor tip and transfers the temperature. Then the difference between the measured temperature values of the first and the second thermistor element 3, 4 is a measure for this flow velocity. The operation of a thermal flow meter is well known, so that at this point only a rough description is given. A temperature measuring device, which only includes one thermistor element 3 is also conceivable and encompassed by embodiments of the invention.

As an alternative to a contacting by means of a conductor film 6 a direct wiring may be provided.

The thermally conductive, electrically insulating layer 2 in the form of a ceramic substrate extends over the recess 20 at the end face 12. Within the recess 20, i.e. between the ceramic substrate 2 and the housing wall 11a, the solder 21 is disposed, via which the ceramic substrate 2 and the housing 11 are connected to each other in order to conduct the temperature of the medium to the thermistor element 3 without severe losses through the housing 11. By means of the recess 20 a uniform and reproducible solder thickness is achieved, so that the thermal coupling between the thermistor element 3 and the housing 11 is reproducible and thus the adjustment effort is reduced. For simple applications, that is, depending on the accuracy requirements, an adjusting process can even be dispensed with.

During the manufacturing process the ceramic substrate 2 is soldered to the inner wall 11a of the housing of the sensor tip 10 by punctually supplying heat energy to the outside of the end face 12 of the housing, after the ceramic substrate 2 is introduced with the thermistor element 3 into the housing 11 of the sensor tip 10. Preferably, these punctual heat supply is implemented by means of a laser beam.

Figure 3:
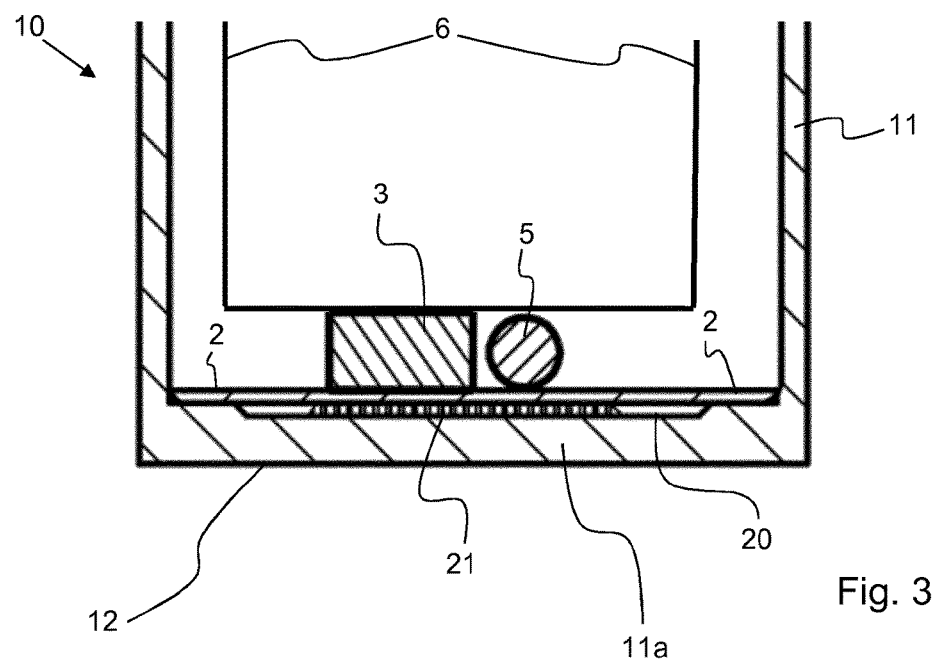
FIG. 3 shows a more enlarged sectional view of the sensor tip of the measuring device of FIG. 2.

In FIG. 3, the lower part of the sensor tip 10 is shown more enlarged. It is clearly visible how the ceramic substrate 2 covers the recess 20 and rests on the inside of the end face 12 of the housing at the right and left side of the recess 20.

Thus, the ceramic substrate 2 acts as a lid and allows the uniform distribution of the solder 21 within the recess 20, while providing for a very good heat transfer from the housing wall 11a or the end face 12 to the thermistor element 3.

The inside of the housing wall 11a preferably comprises a nickel copper coating in order to facilitate the bonding with the solder 21 and thus to improve the soldering process itself.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A measuring device, for use in the process measurement technology, comprising:
   a cylindrical sensor tip which comprises a closed housing, a sensor element disposed within the housing in the form of a temperature dependent resistor and for generating a sensor signal, and electronic components, which are connected to the sensor element via electrical connecting lines and/or a conductor film,
   wherein the sensor element is thermally connected to the housing by means of a solder and a heat conducting, electrically insulating layer is disposed between the sensor element and the solder,
   wherein,
   the housing has a step-like recess which is not penetrating the housing; and
   the thermally conductive, electrically insulating layer is configured as a ceramic substrate that covers the recess and rests on an inside of the housing at opposite sides of the recess,
   wherein the recess is disposed at the inside of the housing and is adapted to receive the solder, via which the sensor element is thermally connected to the housing, and wherein the solder distributes itself with the same thickness in the recess so that in the region of the recess between the housing wall and the ceramic substrate and hence also between the housing wall and the sensor element a defined distance is established.

2. The measuring device according to claim 1, wherein the step-like recess is formed by reducing the wall thickness of the housing.

3. The measuring device according to claim 1, wherein the step-like recess is formed by a forming process, in particular by deep drawing.

4. The measuring device according to claim 1, wherein the step-like recess is formed by an annular body resting on the inside of the housing.

5. The measuring device according to claim 1, wherein the recess has a depth in the range of 100-500 μm, preferably 100-300 μm, particularly preferably 150 μm.

6. The measuring device according to claim 1, wherein the step-like recess of the housing is disposed at the end face of its distal end.

* * * * *